(12) United States Patent
Pacheco et al.

(10) Patent No.: US 10,676,196 B2
(45) Date of Patent: Jun. 9, 2020

(54) ENERGY ATTENUATING MOUNTING FOOT FOR A CABIN ATTENDANT SEAT

(71) Applicant: AMI Industries, Inc., Colorado Springs, CO (US)

(72) Inventors: Chad R. Pacheco, Colorado Springs, CO (US); Douglas Foisie, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 551 days.

(21) Appl. No.: 15/003,233

(22) Filed: Jan. 21, 2016

(65) Prior Publication Data

US 2017/0210474 A1 Jul. 27, 2017

(51) Int. Cl.
| | |
|---|---|
| *B64D 11/06* | (2006.01) |
| *B60P 7/08* | (2006.01) |
| *B64D 25/04* | (2006.01) |
| *B64C 1/20* | (2006.01) |
| *F16B 37/04* | (2006.01) |
| *B60N 2/427* | (2006.01) |

(52) U.S. Cl.
CPC ........ *B64D 11/0619* (2014.12); *B60P 7/0815* (2013.01); *B64D 11/0691* (2014.12); *B64D 11/0696* (2013.01); *B60N 2/42709* (2013.01); *B64C 1/20* (2013.01); *B64D 11/0649* (2014.12); *B64D 25/04* (2013.01); *F16B 37/045* (2013.01)

(58) Field of Classification Search
CPC . B64D 11/0696; B64D 11/0619; B64D 11/06; B64D 25/04; B64D 9/003; B60P 7/0815; B60P 7/0807; B64C 1/20; B60N 2/01558; B60N 2/01575; B60N 2/42709; B60N 2/2884; B60R 2022/286
USPC .............................. 248/503.1; 410/104, 105
See application file for complete search history.

(56) References Cited

U.S. PATENT DOCUMENTS

| | | | | |
|---|---|---|---|---|
| 3,241,501 | A * | 3/1966 | Watts ................... | B60P 7/0815 224/321 |
| 3,392,568 | A * | 7/1968 | Garrity ..................... | B21J 5/02 148/535 |
| 3,620,171 | A * | 11/1971 | Brenia ................. | B61D 45/001 410/105 |
| 3,785,600 | A * | 1/1974 | Padovano .............. | B64D 11/06 248/188.1 |
| 4,047,689 | A * | 9/1977 | Grendahl .............. | B60P 7/0815 410/105 |

(Continued)

*Primary Examiner* — Hiwot E Tefera
*Assistant Examiner* — Taylor L Morris
(74) *Attorney, Agent, or Firm* — Snell & Wilmer, L.L.P.

(57) ABSTRACT

In various embodiments, the present disclosure provides an energy attenuating mounting foot comprising a load beam having a longitudinal axis, a top surface, a bottom surface, an inner track interface lobe, and an outer track interface lobe, the inner track interface lobe and the outer track interface lobe extending laterally from the load beam, and a channel along the longitudinal axis having a depth extending from the load beam bottom surface toward the top surface. In various embodiments, the inner track interface lobe has a first length extending in a direction from the bottom surface towards the top surface and the outer track interface lobe has a second length extending in a direction from the bottom surface towards the top surface, the first length being less than the second length.

17 Claims, 17 Drawing Sheets

(56) References Cited

U.S. PATENT DOCUMENTS

| | | | | |
|---|---|---|---|---|
| 4,062,298 A * | 12/1977 | Weik | B60P 7/0815 | 248/503 |
| 4,230,432 A * | 10/1980 | Howell | B60P 7/0815 | 248/503.1 |
| 4,496,271 A * | 1/1985 | Spinosa | B64C 1/20 | 248/503.1 |
| 4,676,556 A * | 6/1987 | Yamanoi | B60R 22/26 | 297/216.1 |
| 4,796,837 A * | 1/1989 | Dowd | B64D 11/0696 | 244/122 R |
| 4,861,103 A * | 8/1989 | Vallee | B64D 25/04 | 297/216.2 |
| 4,878,640 A * | 11/1989 | Fricker | E04B 1/4107 | 248/297.21 |
| 4,911,381 A * | 3/1990 | Cannon | B64D 11/0696 | 244/122 R |
| 4,932,816 A * | 6/1990 | Ligensa | B64D 9/003 | 244/118.6 |
| 5,083,726 A * | 1/1992 | Schurr | B64D 11/0696 | 244/118.6 |
| 5,178,346 A * | 1/1993 | Beroth | B64D 9/003 | 244/118.1 |
| 5,344,210 A * | 9/1994 | Marwan | B64D 25/04 | 297/216.2 |
| 5,409,186 A * | 4/1995 | Chow | B64D 11/06 | 165/41 |
| 5,449,132 A * | 9/1995 | Gilbert | B64D 11/0696 | 244/122 R |
| 5,489,172 A * | 2/1996 | Michler | B64C 1/20 | 244/118.1 |
| 5,625,926 A * | 5/1997 | Berrezouga | B60P 7/0807 | 24/265 CD |
| 5,636,901 A * | 6/1997 | Grilliot | B60N 2/015 | 248/188.1 |
| 5,730,492 A * | 3/1998 | Warrick | B60N 2/4221 | 297/216.2 |
| 5,743,592 A * | 4/1998 | Bedouch | B64D 11/06 | 297/216.1 |
| 5,762,296 A * | 6/1998 | Gilbert | B64D 11/0696 | 244/118.1 |
| 5,765,978 A * | 6/1998 | Looker | B60P 7/0815 | 410/101 |
| 5,788,185 A * | 8/1998 | Hooper | B64D 11/0619 | 244/118.6 |
| 5,813,649 A * | 9/1998 | Peterson | B60N 2/42709 | 248/300 |
| 5,823,727 A * | 10/1998 | Lee | F16B 37/045 | 411/85 |
| 5,855,844 A * | 1/1999 | Martin | C22C 38/50 | 148/327 |
| 5,871,318 A * | 2/1999 | Dixon | B60N 2/01558 | 244/118.1 |
| 6,074,004 A * | 6/2000 | Carmichael | B60N 2/4221 | 297/216.13 |
| 6,260,813 B1 * | 7/2001 | Whitcomb | B64D 11/0696 | 244/118.6 |
| 6,302,477 B1 * | 10/2001 | Satou | B60R 13/0206 | 280/751 |
| 6,789,988 B1 * | 9/2004 | Moradians | B60P 7/0815 | 248/503 |
| 7,021,596 B2 * | 4/2006 | Lory | B60P 7/0815 | 248/423 |
| 7,318,695 B2 * | 1/2008 | Yu | B60P 7/0815 | 410/105 |
| 7,334,758 B2 * | 2/2008 | Williamson | B64D 11/0696 | 244/118.6 |
| 7,401,995 B2 * | 7/2008 | Senakiewich, II | B60P 7/0815 | 403/374.4 |
| 7,427,049 B2 * | 9/2008 | Kennedy | B64D 11/0696 | 244/118.5 |
| 7,438,511 B2 * | 10/2008 | Legeay | B64D 11/0696 | 410/104 |
| 7,607,736 B2 * | 10/2009 | Ponzo De Siqueira | B64D 11/0696 | 244/118.1 |
| 7,641,426 B2 * | 1/2010 | Stubbe | B64D 11/0696 | 410/104 |
| 7,980,798 B1 * | 7/2011 | Kuehn | B61D 45/00 | 410/104 |
| 7,988,393 B2 * | 8/2011 | Poupon | B60N 2/07 | 410/102 |
| 8,074,954 B2 * | 12/2011 | Wilhelm | B64D 11/0696 | 244/118.6 |
| 8,182,183 B2 * | 5/2012 | Cook | B60N 2/01558 | 244/118.1 |
| 8,322,955 B2 * | 12/2012 | Arnesen | G06K 19/07749 | 248/346.02 |
| 8,408,853 B2 * | 4/2013 | Womack | B60P 7/0815 | 410/104 |
| 8,517,310 B2 * | 8/2013 | Marechal | B60N 2/01516 | 244/118.6 |
| 8,821,089 B2 * | 9/2014 | Hearn | B60N 2/01508 | 410/105 |
| 10,259,585 B2 * | 4/2019 | Sodore | B64D 11/0696 | |
| 2005/0012013 A1 * | 1/2005 | Dill | B60N 2/0705 | 248/424 |
| 2006/0263164 A1 * | 11/2006 | Dowty | B64D 11/0696 | 410/105 |
| 2007/0063122 A1 * | 3/2007 | Bowd | B64C 1/20 | 248/429 |
| 2007/0122254 A1 * | 5/2007 | LaConte | B64D 11/0696 | 411/551 |
| 2009/0230241 A1 * | 9/2009 | Heller | B60P 7/0815 | 244/118.1 |
| 2009/0282655 A1 * | 11/2009 | James | B64C 1/20 | 24/458 |
| 2010/0067999 A1 * | 3/2010 | Poupon | B64D 11/0696 | 410/105 |
| 2010/0124457 A1 * | 5/2010 | Cook | B60N 2/01558 | 403/409.1 |
| 2010/0180990 A1 * | 7/2010 | Irander | B60J 5/0426 | 148/608 |
| 2011/0278398 A1 * | 11/2011 | Marechal | B60N 2/01516 | 244/131 |
| 2012/0235011 A1 * | 9/2012 | Roy | B64D 11/0696 | 248/503.1 |
| 2013/0081233 A1 * | 4/2013 | Lu | B60P 7/0815 | 24/185 |
| 2013/0328364 A1 * | 12/2013 | Cecinas | B60N 2/20 | 297/216.1 |
| 2014/0064845 A1 * | 3/2014 | Mueller | F16S 5/00 | 403/404 |
| 2014/0271021 A1 * | 9/2014 | Cardona | F16B 7/187 | 410/104 |
| 2015/0115101 A1 * | 4/2015 | Thomaschewski | B64D 11/0696 | 244/118.6 |
| 2016/0107542 A1 * | 4/2016 | Trimble | B60N 2/01575 | 296/65.03 |
| 2016/0251082 A1 * | 9/2016 | Shih | B64D 11/0696 | 248/636 |
| 2016/0332735 A1 * | 11/2016 | Sodore | B64D 11/0696 | |
| 2017/0190408 A1 * | 7/2017 | Burd | B64D 11/04 | |

* cited by examiner

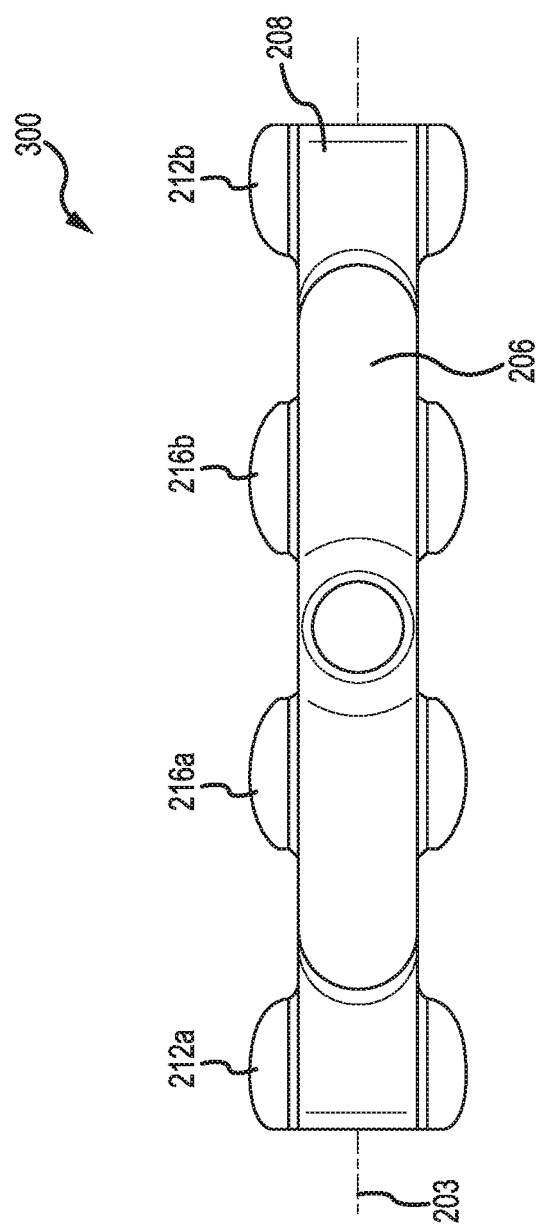

SECTION A-A

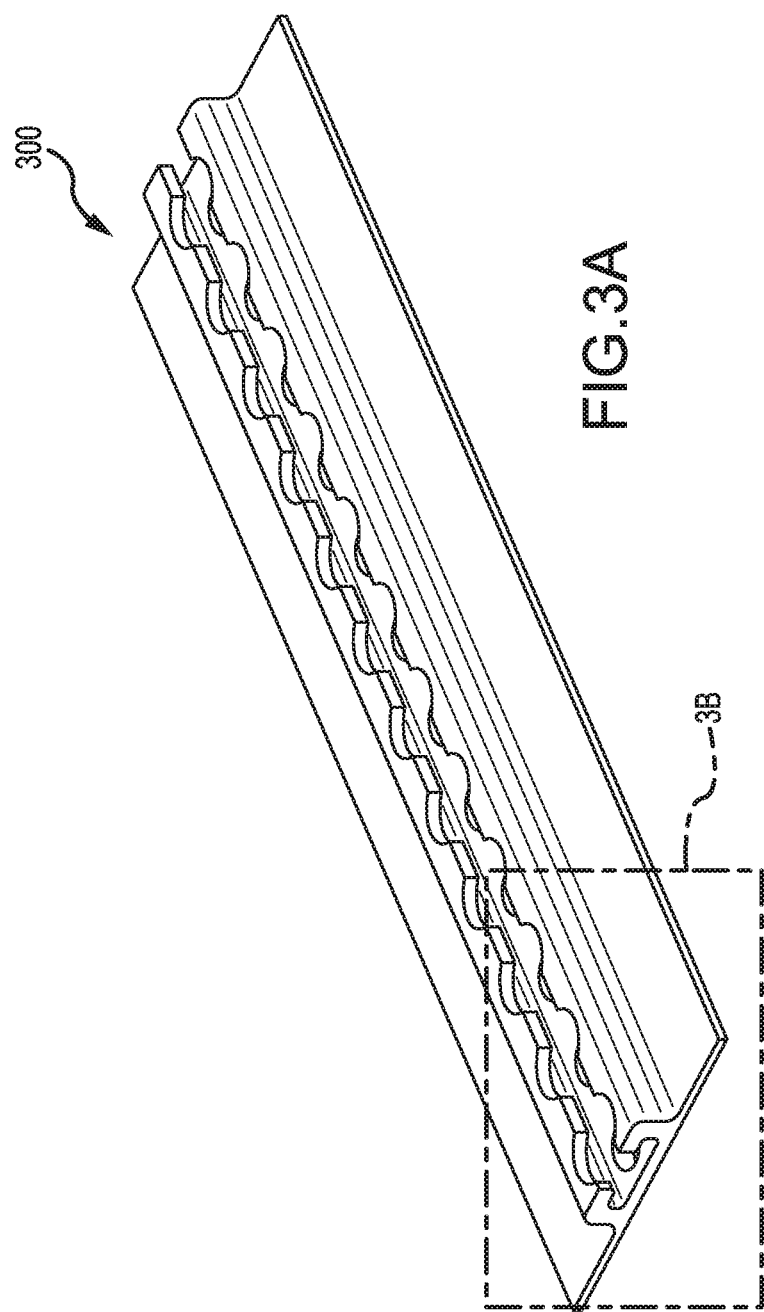

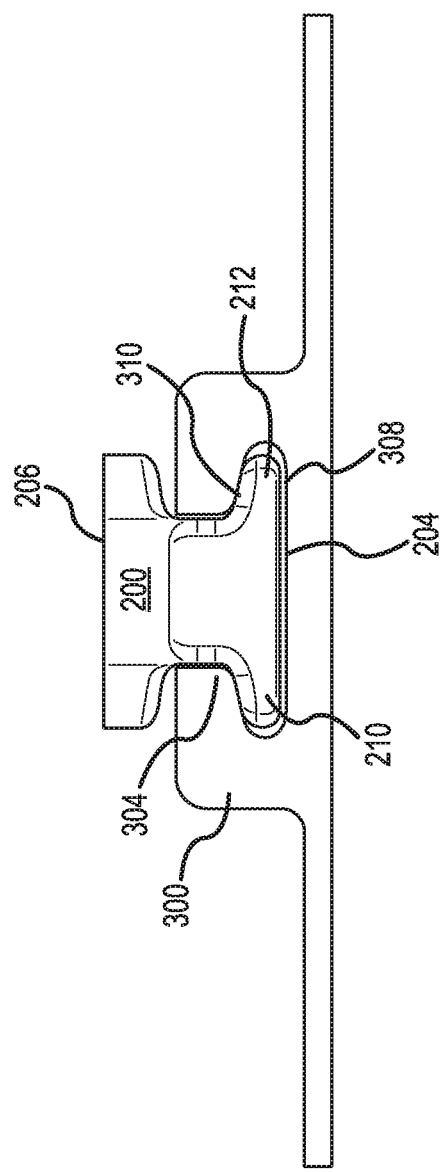

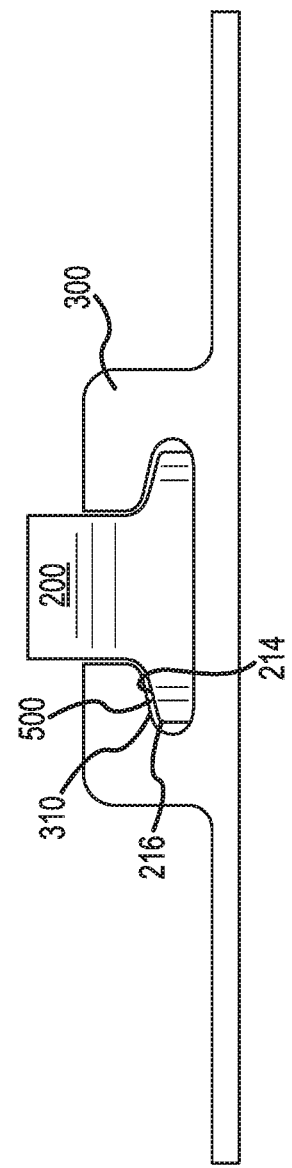

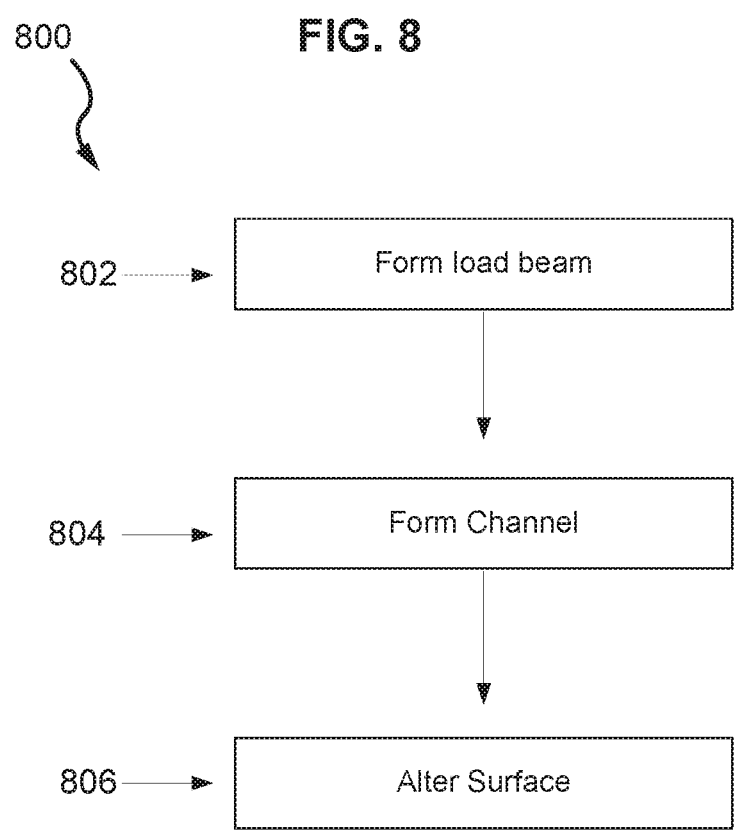

ENERGY ATTENUATING MOUNTING FOOT FOR A CABIN ATTENDANT SEAT

FIELD

The present disclosure relates to restraint devices for vehicle interior fixtures. More specifically, this disclosure described relates to improved track fittings that attenuate the loads transmitted to a track.

BACKGROUND

To facilitate interior installation and reconfiguration, aircraft cabin fixtures may be secured to rails or tracks which typically are attached to interior portions of the aircraft cabin. Fixtures installed on tracks may be repositioned and locked into place along the track, thus allowing for a great number of possible configurations to meet customer and operator needs. A mounting member typically mates the track to the aircraft cabin fixture and transmits mechanical load between the aircraft cabin fixture and the track.

SUMMARY

In various embodiments, the present disclosure provides an energy attenuating mounting foot comprising a load beam having a longitudinal axis, a top surface, a bottom surface, and an inner track interface lobe and an outer track interface lobe, the inner track interface lobe and the outer track interface lobe extending laterally from the load beam, and a channel along the longitudinal axis having a depth extending from the load beam bottom surface toward the top surface. In various embodiments, the inner track interface lobe has a first length extending in a direction from the bottom surface towards the top surface and the outer track interface lobe has a second length extending in a direction from the bottom surface towards the top surface, the first length being less than the second length.

In various embodiments, the inner track interface lobe and inner track interface lobe are shaped to fit through an opening of a track having a mounting foot interface lobe. In various embodiments, the inner track interface lobe is separated from the mounting foot interface lobe. In various embodiments, the inner track interface lobe contacts the mounting foot interface lobe in response to a load placed on the load beam. In various embodiments, the channel extends along a portion of the longitudinal axis. In various embodiments, the mounting foot comprises at least one of steel, aluminum, aluminum alloy, titanium, or titanium alloy. In various embodiments, the load beam comprises a martensitic precipitation-hardening stainless steel. In various embodiments, a material grain direction of the load beam substantially parallels the longitudinal axis. In various embodiments, the load beam undergoes plastic deformation across the channel in response to a load placed on the load beam. In various embodiments, the load beam further comprises a stud. In various embodiments, the stud is coupled to a cabin fixture.

In various embodiments, the present disclosure provides an energy attenuating mounting foot comprising a load beam having a longitudinal axis, a top surface, a bottom surface, a first inner track interface lobe, a second inner track interface lobe, a first outer track interface lobe and a second outer track interface lobe, the first inner track interface lobe, the second inner track interface lobe, the first outer track interface lobe and the second outer track interface lobe extending laterally from the load beam. In various embodiments, the first inner track interface lobe, the second inner track interface lobe, the first outer track interface lobe and the second outer track interface lobe are displaced along the longitudinal axis. In various embodiments, the energy attenuating mounting foot further comprises a channel along the longitudinal axis terminating at the first inner track interface lobe and the second inner track interface lobe, the channel having a depth extending from the load beam bottom surface toward the top surface.

In various embodiments, the first inner track interface lobe and the second outer track interface lobe are shaped to fit through openings of a track having a mounting foot interface lobe. In various embodiments, the first inner track interface lobe is separated from the mounting foot interface lobe. In various embodiments, the first inner track interface lobe is configured to contact the mounting foot interface lobe in response to deformation of the load beam. In various embodiments, the load beam comprises a stud. In various embodiments, the load beam comprises at least one of steel, aluminum, aluminum alloy, titanium, or titanium alloy. In various embodiments, the load beam comprises a martensitic precipitation-hardening stainless steel. In various embodiments, a material grain direction of the load beam substantially parallels the longitudinal axis.

In various embodiments, the present disclosure provides a method of manufacturing an energy attenuating mounting foot comprising forming a load beam having a longitudinal axis, a top surface, a bottom surface, and an inner track interface lobe and an outer track interface lobe disposed along the longitudinal axis of the load beam extending laterally from the load beam. In various embodiments, the method further comprises forming a channel along the longitudinal axis of the load beam in the bottom surface of the load beam to a depth between the bottom surface and the top surface.

BRIEF DESCRIPTION OF THE DRAWINGS

FIGS. 2A, 2B, and 2C, illustrate a perspective of an energy attenuating mounting foot, in accordance with various embodiments;

FIG. 3A illustrates an aircraft track, in accordance with various embodiments;

FIG. 4C illustrates a vertical section perpendicular to the longitudinal axis through an energy attenuating mounting foot disposed in an aircraft track taken at an outer track interface lobe, in accordance with various embodiments;

FIG. 5B illustrates a vertical section perpendicular to the longitudinal axis through an energy attenuating mounting foot disposed in an aircraft track taken at an inner track interface lobe, in accordance with various embodiments;

FIG. 8 illustrates a method of manufacturing an energy attenuating mooting foot, in accordance with various embodiments.

Figure 1:
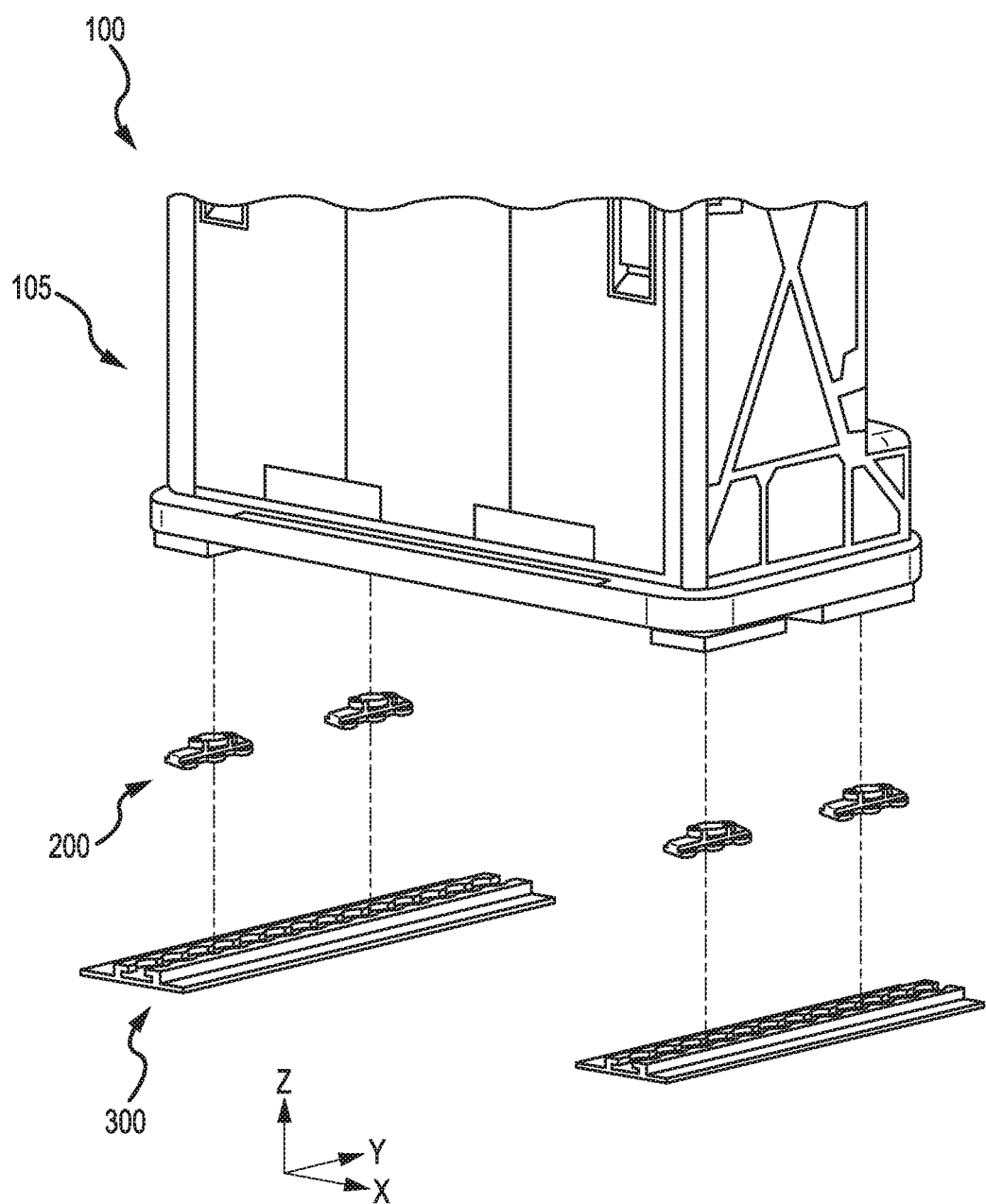
FIG. 1 illustrates a coupling between a seat, an energy attenuating mounting foot, and an aircraft mounting track, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

In various embodiments, an energy attenuating mounting foot is disclosed for interfacing with a track in an aircraft interior. The energy attenuating mounting foot may comprise a cavity or other cut out to allow for deformation in response to bearing load. Such deformation may attenuate the load, thus improving the likelihood that the energy attenuating mounting foot will survive the load without separating. In that regard, the energy attenuating mounting foot may be exposed to a load, deform to a degree (reversibly or irreversibly), and tend to maintain attached to the track. Moreover, in various embodiments, an energy attenuating mounting foot may comprise one or more lobes that do not contact a portion of the track in the absence of a load but do come into contact with the track in response to a load. Such a feature may tend to evenly distribute load from an energy attenuating mounting foot to a track, thus tending to reduce the concentration of load in one or more localized areas of the energy attenuating mounting foot.

With reference now to FIG. 1, in accordance with various embodiments, an assembly 100 comprising cabin fixture 100, an energy attenuating mounting foot 200 and a track 300 is shown. Cabin fixture 100 may comprise an aircraft seat, table, cargo management device, or other aircraft interior fixture. The dashed lines indicate a coupling between the cabin fixture 100, the energy attenuating mounting foot 200 and the track 300. Xyz axes are shown for convenience, with z extending perpendicular to the xy plane. In that regard, a measurement point displaced in the positive z axis direction from a given reference point may be considered "above" or on "top" of the given reference point. In contrast, a measurement point displaced in the negative z axis direction from the given reference point may be considered "below" or on "bottom" of the given reference point. In that regard, the terms "top" and "bottom" may refer to relative positions along the z axis. For example, cabin fixture 100 is on top of energy attenuating mounting foot 200, energy attenuating mounting foot 200 is on top of track 300, and track 300 is below cabin fixture 100.

Figure 2A:
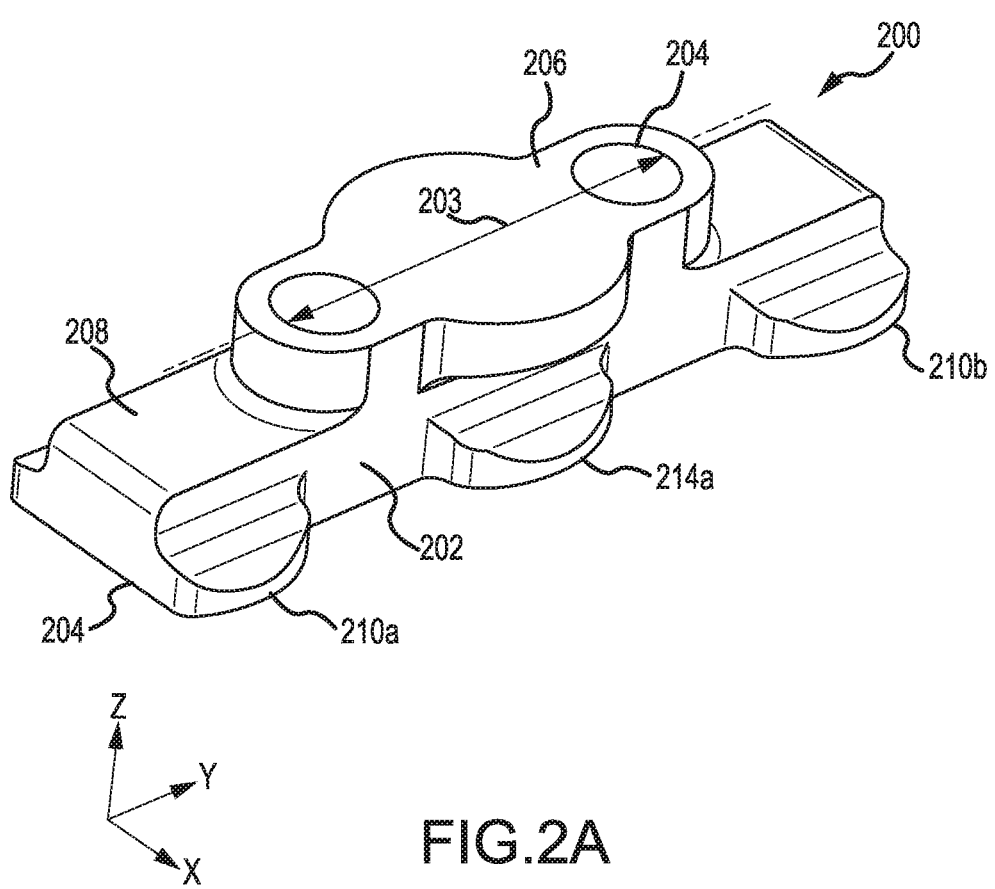

In various embodiments and with reference now to FIG. 2A, an energy attenuating mounting foot 200 may comprise load beam 202 having a longitudinal axis 203. Energy attenuating mounting foot 200 may further comprise top surface 206 configured to be coupled to a cabin fixture such as cabin fixture 100 and a bottom surface 204. In various embodiments, the load beam 202 may have steps 208 cut from the load beam top surface 206 and may feature threaded couplings 207 in top surface 206. In various embodiments, a stud 222 configured to couple to a cabin fixture such as cabin fixture 100 may extend upward from the load beam top surface 206. The stud 222 may be threaded to facilitate coupling the energy attenuating mounting foot 200 to a cabin fixture such as cabin fixture 100. Energy attenuating mounting foot 200 comprises inner track interface lobes 214a and outer track interface lobes 210a and 210b spaced along the longitudinal axis 203 and extending from laterally (along the x axis) side of the load beam 202.

In various embodiments and with reference now to FIGS. 2B, 2C, 2E and 2F, an energy attenuating mounting foot 300 may comprise features shared with energy attenuating mounting foot 200, though energy attenuating mounting foot 300 comprises inner track interface lobes 214b, 216a and 216b.

In various embodiments, an energy attenuating mounting foot may be made of metal, an alloy, aluminum, aluminum alloy, titanium, titanium alloy, steel, a martensitic precipitation-hardening stainless steel such as that sold commercially as both 17-4® stainless steel and/or 15-St stainless steel. In various embodiments, an energy attenuating mounting foot may be surface treated or heat treated. In various embodiments, the mounting foot may be heat treated to H1025 and passivated per AMS-2700, Type 2, Class III protocol as set forth by SAE International. In various embodiments, an energy attenuating mounting foot may have a material grain direction substantially parallel to its longitudinal axis such as longitudinal axis 203.

In various embodiments and with reference now to FIG. 2C, apart from the load beam top surface 206 and step 208, inner track interface lobe 214a has a first surface 216a and outer track interface lobe 216a has a second surface 212a.

Figure 2B:
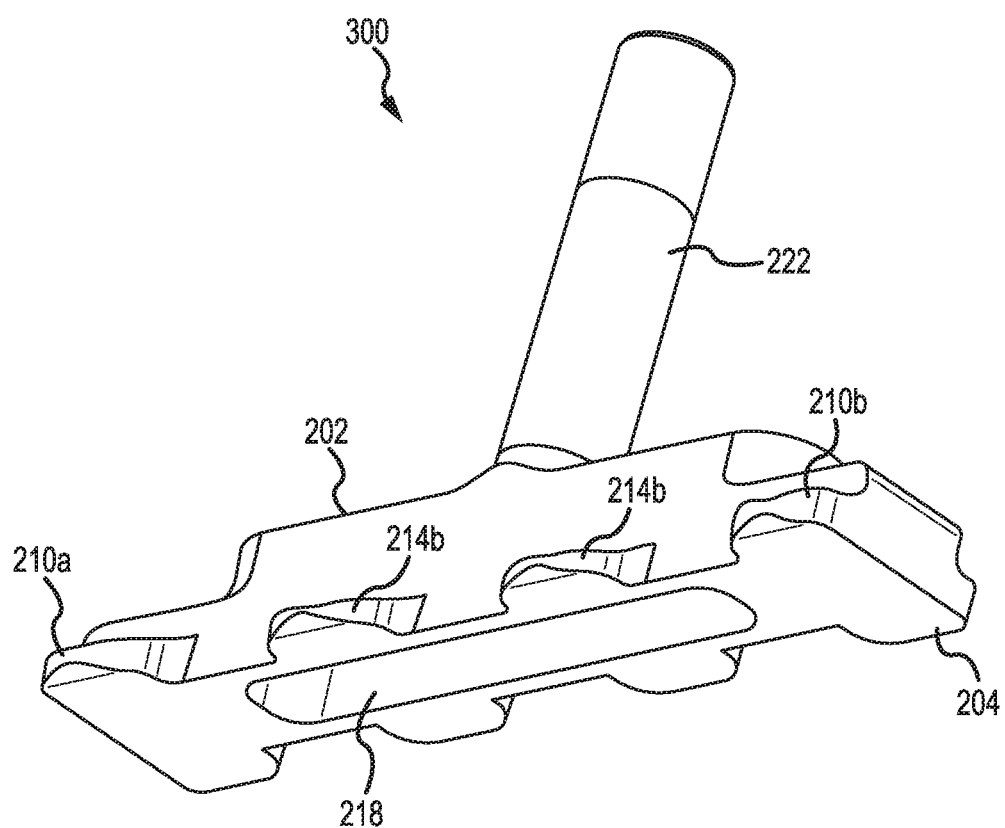
Figure 2D:
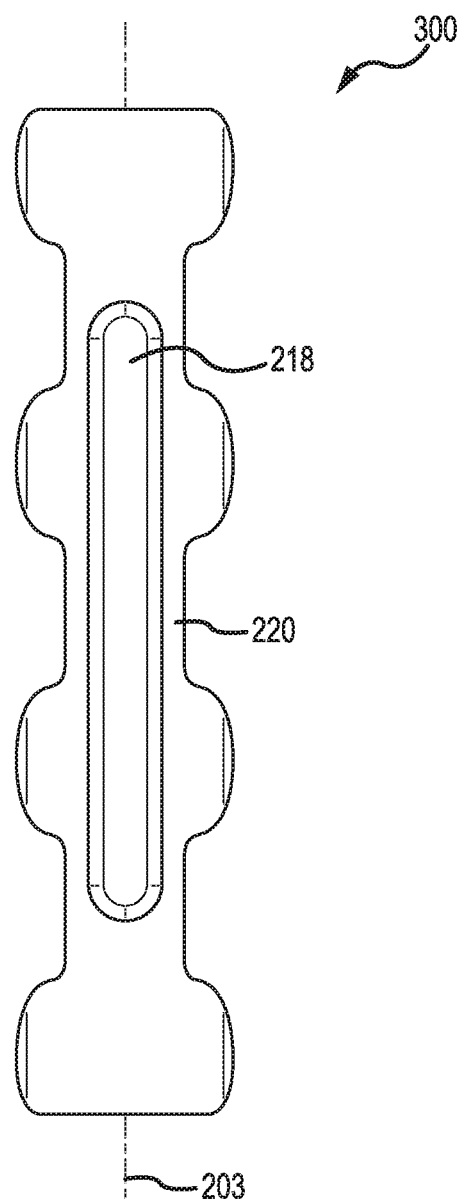
FIG. 2D illustrates a bottom view of an energy attenuating mounting foot detailing a channel cut into the load beam, in accordance with various embodiments.

In various embodiments and with reference now to FIGS. 2B and 2D, a channel 218 is cut into the load beam bottom surface 204 along longitudinal axis 203 between the inner track interface lobe 214a and inner track interface lobe 214a, leaving a thickness of sidewall 220 between the inner track interface lobes.

Figure 2E:
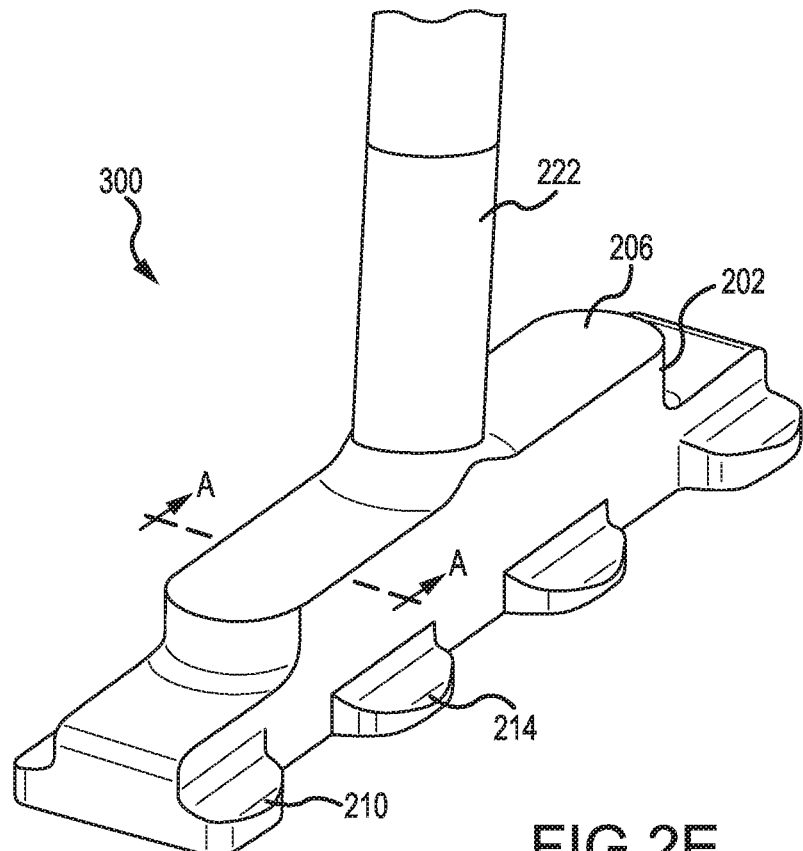
FIG. 2E illustrates a perspective of an energy attenuating mounting foot noting the plane of a sectional view, in accordance with various embodiments.
Figure 2F:
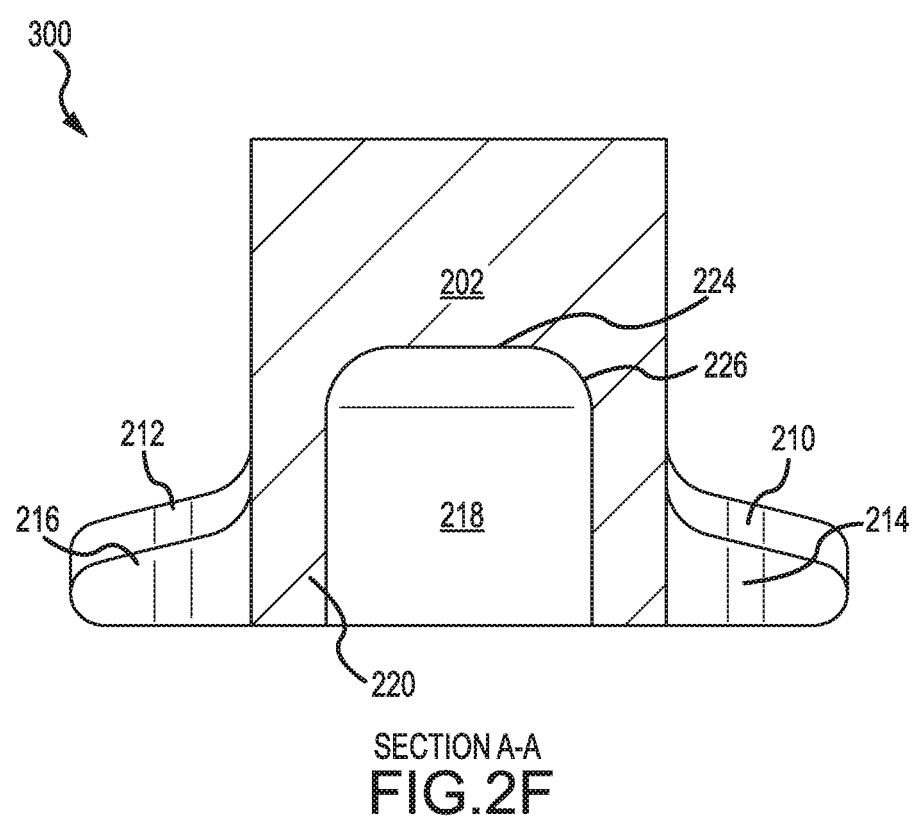
FIG. 2F illustrates a vertical section perpendicular to the longitudinal axis through an energy attenuating mounting foot, in accordance with various embodiments.

In various embodiments and with reference now to FIGS. 2E and 2F, the channel 218 is cut a depth (along z axis) from the load beam bottom surface 204 into the load beam 202 toward the load beam top surface 206, leaving a channel floor 224 with filleted edges 226. The first surface 216 of inner 214 track interface lobe lies below the plane defined by the second surface 212 of the outer 210 track interface lobe. Stated another way, the first surface 216 is more proximate the bottom surface 204 of the load beam than the second surface 212 is proximate the bottom surface 204 of the load beam.

Figure 3B:
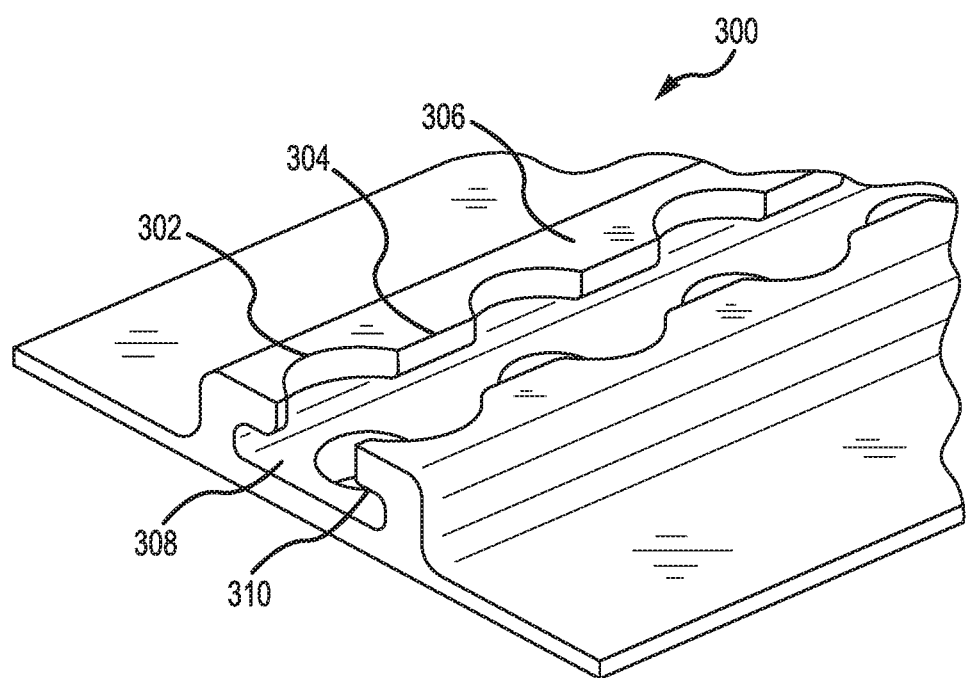
FIG. 3B illustrates detailed features of an aircraft track, in accordance with various embodiments.

In various embodiments and with reference now to FIGS. 3A and 3B, an aircraft track 300 is shown. The aircraft track 300 has cutouts 302 to admit the inner 214 and outer 210 track interface lobes of an energy attenuating mounting foot 200 and a mounting foot interface lobe 304 to engage a track interface lobe of the mounting foot. Track 300 has a top surface 306 and a bottom surface 308 and an interior surface 310 of a mounting foot interface lobe 304.

Figure 4A:
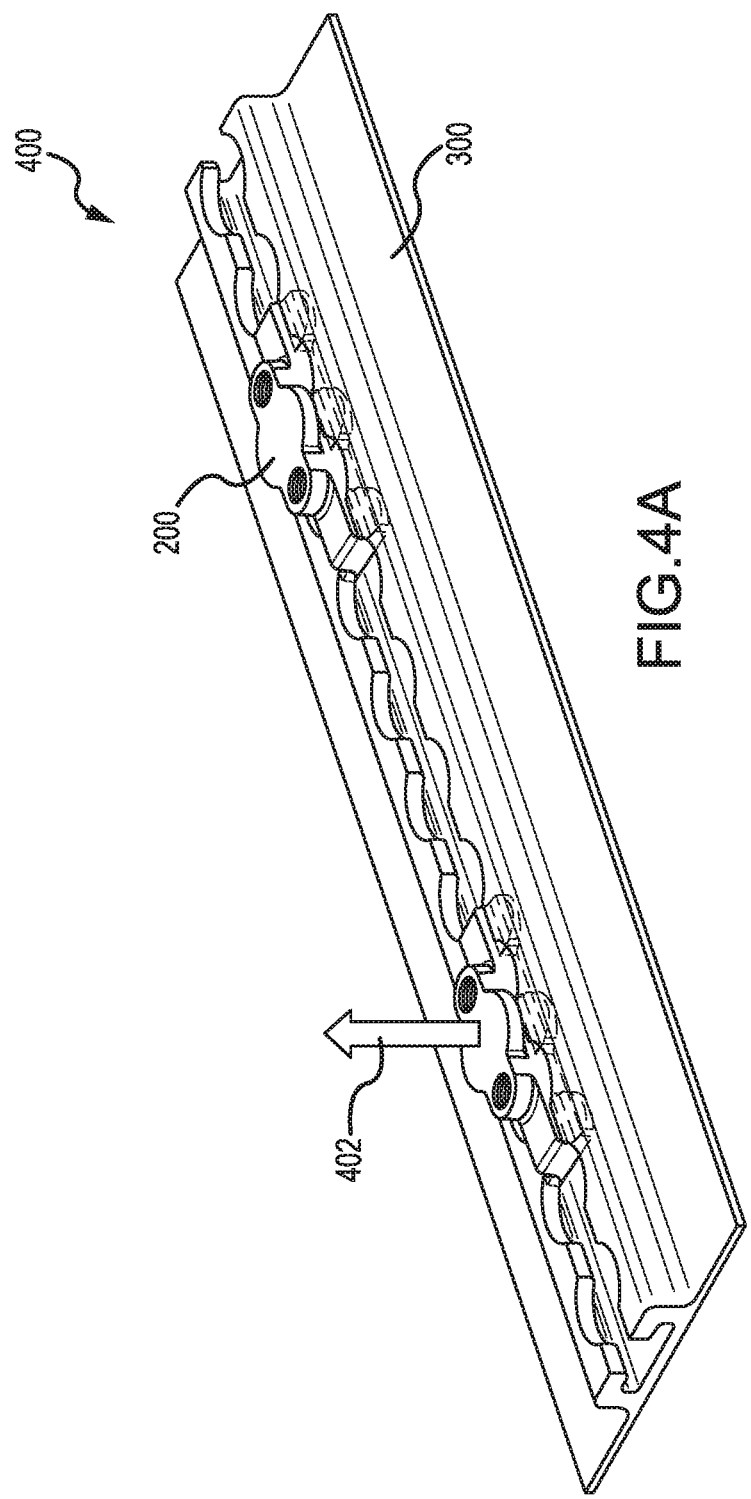
FIG. 4A illustrates an energy attenuating mounting foot disposed in an aircraft track subjected to an upward force, in accordance with various embodiments.
Figure 5A:
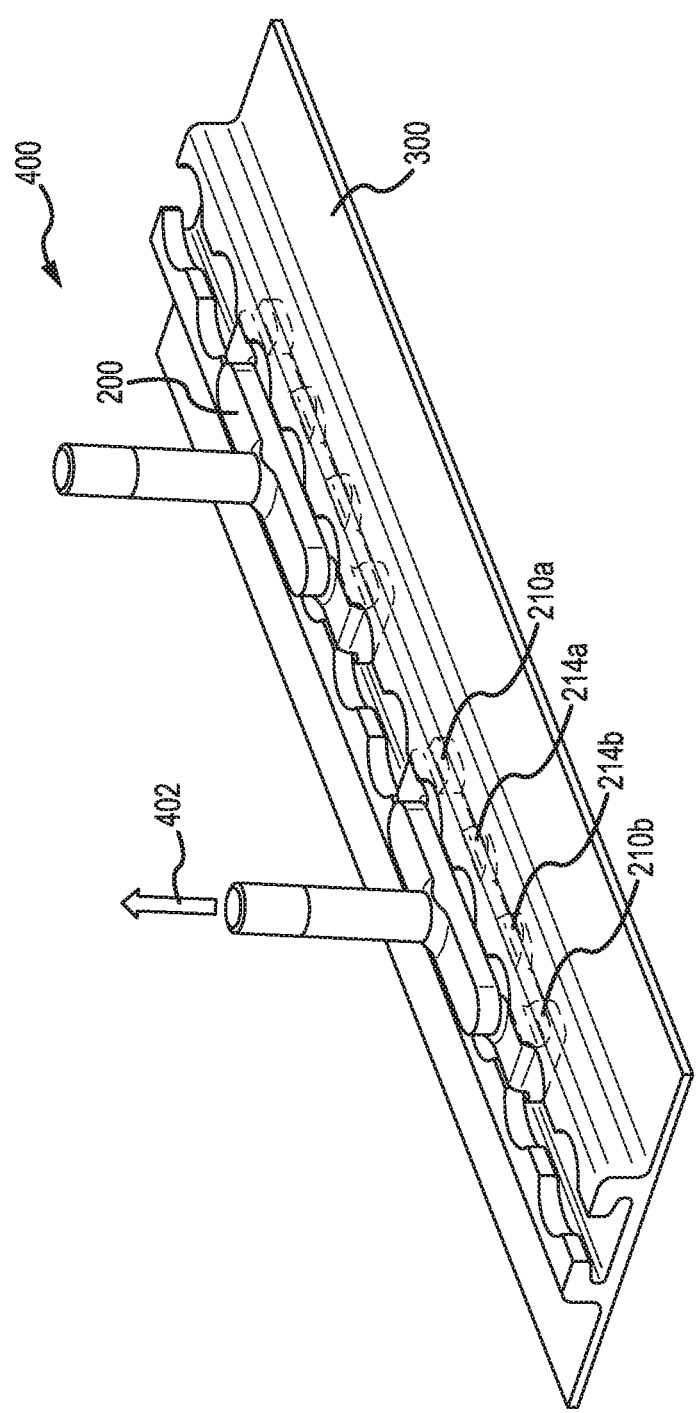
FIG. 5A illustrates an energy attenuating mounting foot disposed in an aircraft track subjected to an upward force, in accordance with various embodiments.

In various embodiments and with reference now to FIGS. 4A and 5A, an assembly 400 comprising energy attenuating mounting foot 200 disposed within track 300 is subjected to an upward force 402. The assembly 400 resists the upward force by engagement of the inner interface lobes 214 and outer interface lobes 210 against the mounting foot interface lobes 304.

Figure 4B:
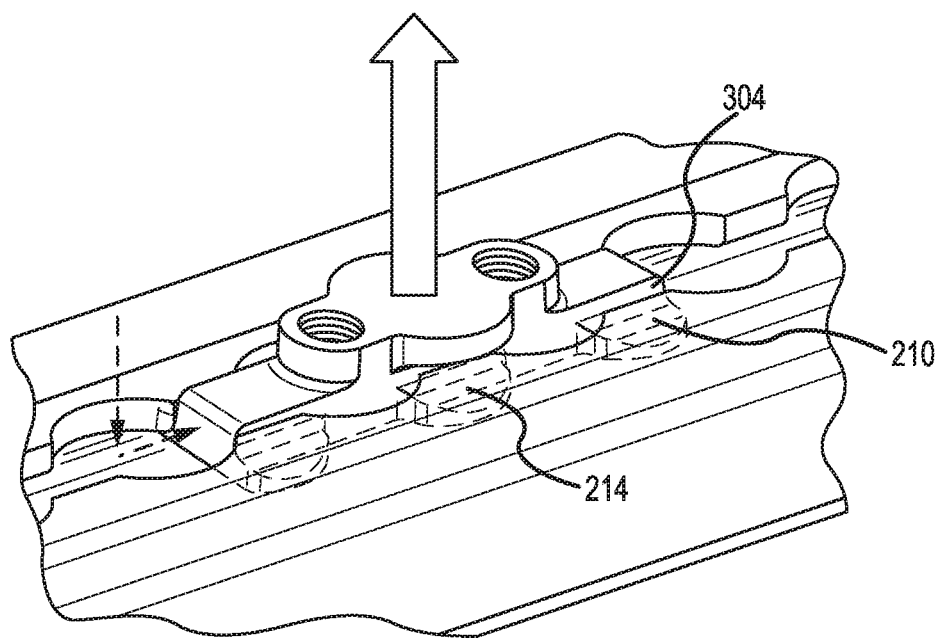
FIG. 4B illustrates an energy attenuating mounting foot disposed in an aircraft subjected to an upward force with interface lobes engaging, in accordance with various embodiments

In various embodiments and with reference now to FIG. 4B, engagement of the lobes is achieved by inserting the energy attenuating mounting foot into the track and sliding it along the track as indicated by the dashed arrows. The inner interface lobes 214 and outer interface lobes 210 lobes of the energy attenuating mounting foot 200 are inserted through the cutouts 302 of the track 300. Then, by sliding the energy attenuating mounting foot along track 300, the inner interface lobes 214 and outer interface lobes 210 track interface lobes are brought to rest under the mounting foot interface lobes 304 of the track 300. In this state, absent upward force 402, inner interface lobes 214 do not contact track 300 but outer interface lobes 210 do contact track 300, and in particular, mounting foot interface lobes 304. In response to upward force 402, interface lobes 214 may be displaced in the positive z direction and contact mounting foot interface lobes 304.

In various embodiments and with reference now to FIG. 4C, the outer 210 track interface lobes of the energy attenuating mounting foot 200 are engaged with mounting foot interface lobes of the track 300 when the second surface 212 of the outer interface lobes 210 is in contact with an interior surface 310 of the mounting foot interface lobe 304 and the bottom surface 204 of energy attenuating mounting foot 200 is proximate the bottom surface 308 of the track 300.

In various embodiments and with reference now to FIG. 5B, the inner 214 track interface lobes of the energy attenuating mounting foot 200 are engaged with mounting foot interface lobes of the track 300 when the first surface 216 of the inner interface lobe 214 lobe is separated from an interior surface 310 of the mounting foot interface lobe 304 by a gap 500. Exposure to an upward force 402, for example a 16 G dynamic load cause the load beam 202 of the energy attenuating mounting foot 200 to undergo plastic deformation, closing the gap 500 and bringing the first surface 216 of the inner track interface lobe 214 into contact with the interior surface 310 of the mounting foot interface lobe 304. In various embodiments the gap may be about 0.04 inches/ 1.02 mm or less, where the term "about" in this context means+/−0.01 inches/0.0254 cm.

Figure 6:
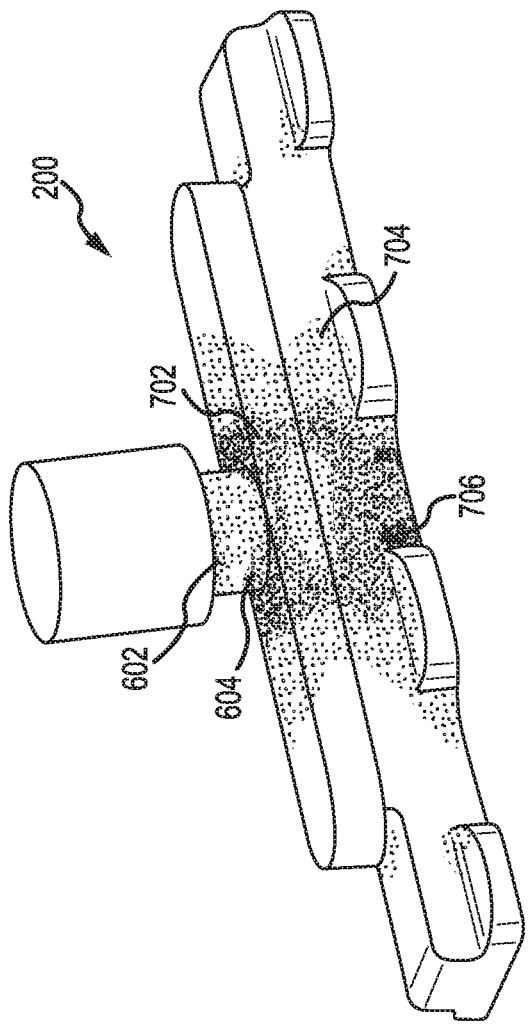
FIG. 6 illustrates a contour plot of stresses within an energy attenuating mounting foot when exposed to 16 G dynamic loads, in accordance with various embodiments.
Figure 6:
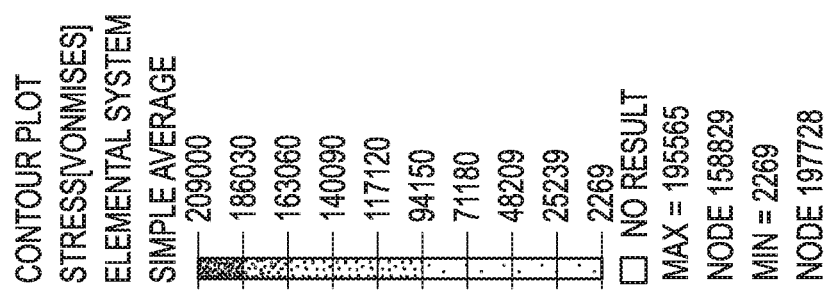

In various embodiments and with reference now to FIG. 6, a contour plot representing the stresses in energy attenuating mounting foot 200 mounted to track 300 and subjected to a load condition. Stress concentrations 602 and 604 are still present in the energy attenuating foot 200 but much stress has been attenuated through migration into the load beam with large areas of concentration at 702 and 704 and the greatest stresses at 706, evidencing deformation of the load beam 202.

Figure 7:
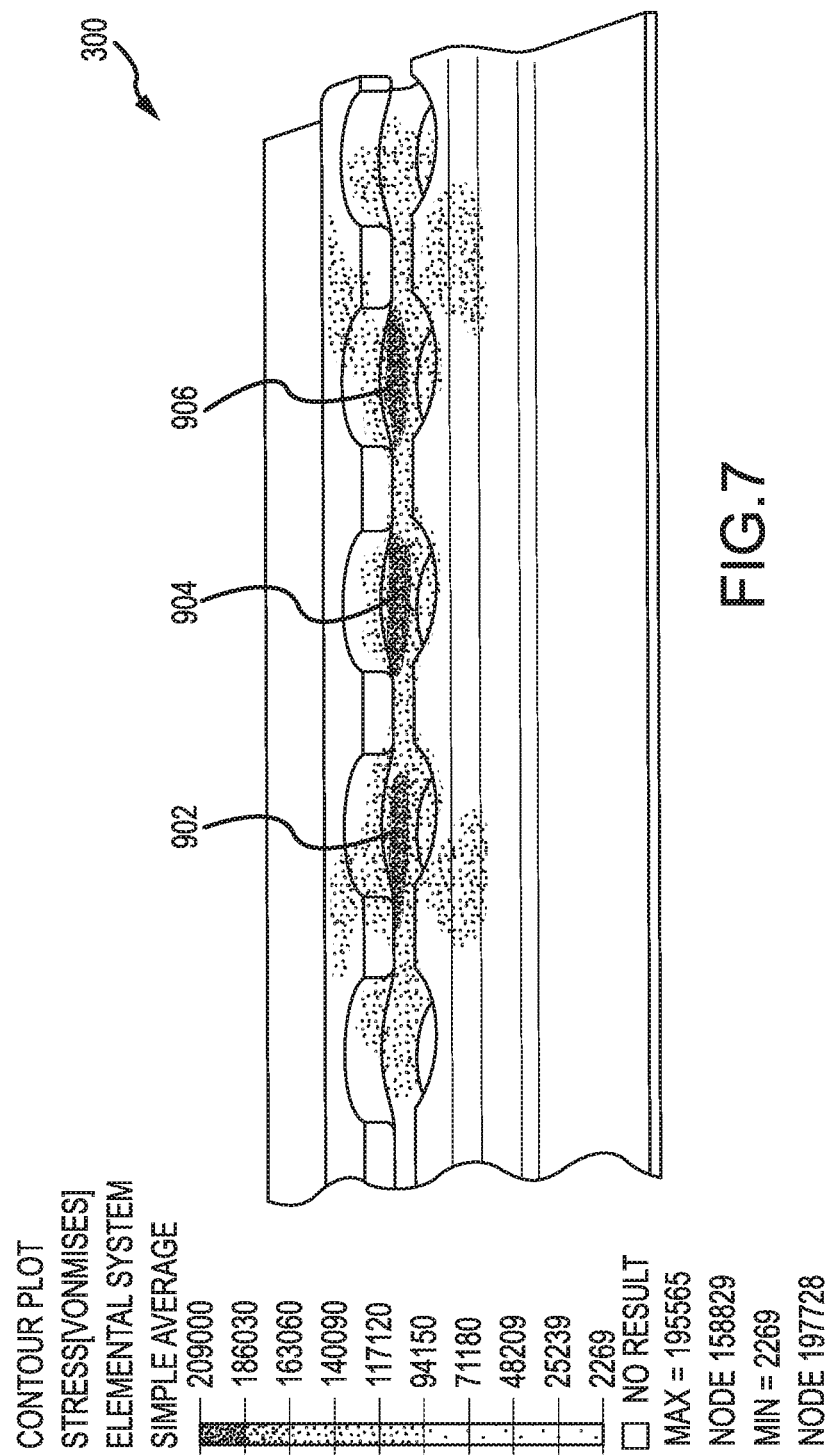
FIG. 7 illustrates a contour plot of stresses within an aircraft track coupled to an energy attenuating mounting foot with lobes engaged when exposed to 16 G dynamic loads, in accordance with various embodiments.

In various embodiments and with reference now to FIG. 7, a contour plot representing the stresses in a track 300 driven by the energy attenuating mounting foot 200 subjected to a 16 G load condition shows several stress concentrations at 902, 904, and 906 which have been attenuated by the energy attenuating mounting foot to levels below the failure point of the track material.

In various embodiments and with reference to FIG. 8, a method 800 of manufacturing an energy attenuating mounting foot may comprise forming a load beam 802 having a longitudinal axis, a top surface, a bottom surface, and at least one inner track interface lobe and at least two outer track interface lobes along the longitudinal axis of the load beam extending laterally from the load beam, Forming a channel 804 along the long axis of the load beam in bottom surface of the load beam to a depth between the bottom surface and the top surface of the load beam. Forming a channel 804 may be accomplished by any of the techniques commonly known in the art such as end milling with a square end cutter or ball end cutter or the like. Altering a surface 806 of an inner track interface lobe such that the altered surface is disposed below a plane defined by an outer track interface lobe surface. Altering the surface 806 of an inner track interface lobe may be accomplished by any of the techniques commonly known in the art such as end milling, or by face milling, or by grinding, or by ablation, or by electrical discharge machining.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. An energy attenuating mounting foot comprising:
   a monolithic load beam having a longitudinal axis, a top surface, a bottom surface, an inner track interface lobe, and an outer track interface lobe, the inner track interface lobe and the outer track interface lobe extending laterally from the load beam, and
   a channel along the longitudinal axis having a depth extending from the bottom surface toward the top surface,
   wherein the inner track interface lobe has a first upper surface lying below a plane defined by a second upper surface of the outer track interface lobe,
   wherein each of the inner track interface lobe and the outer track interface lobe are integral to the monolithic load beam,
   wherein the inner track interface lobe and the outer track interface lobe are each configured to couple with a track having a plurality of mounting foot interface lobes,
   wherein the monolithic load beam is configured to undergo a plastic deformation along the channel in response to a load normal to the longitudinal axis, wherein the plastic deformation is configured to close a gab between the first upper surface of the inner track interface lobe and an interior surface of one of the plurality of mounting foot interface lobes, such that the monolithic load beam is further configured to arrest the plastic deformation along the channel in response to a contact between the inner track interface lobe and said interior surface of one of the plurality of mounting foot interface lobes.

2. The energy attenuating mounting foot of claim 1, wherein in response to coupling with the track, each of the inner track interface lobe and the outer track interface lobe lie below a plane defined by the plurality of mounting foot interface lobes.

3. The energy attenuating mounting foot of claim 1, wherein the outer track interface lobe contacts the plurality of mounting foot interface lobes and the inner track interface lobe is separated from the plurality of mounting foot interface lobes in response to coupling with the track.

4. The energy attenuating mounting foot of claim 1, wherein the channel extends along a portion of the longitudinal axis.

5. The energy attenuating mounting foot of claim 1, wherein the load beam comprises at least one of steel, aluminum, aluminum alloy, titanium, or titanium alloy.

6. The energy attenuating mounting foot of claim 1, wherein the load beam comprises a martensitic precipitation-hardening stainless steel.

7. The energy attenuating mounting foot of claim 5, wherein a material grain direction of the load beam substantially parallels the longitudinal axis.

8. The energy attenuating mounting foot of claim 1, wherein the load beam further comprises a stud integral to the load beam.

9. The energy attenuating mounting foot of claim 8, wherein the stud is coupled to a cabin fixture.

10. An energy attenuating mounting foot comprising:
    a monolithic load beam having a longitudinal axis, a top surface, a bottom surface, a first side surface, a second side surface, a first inner track interface lobe, a second inner track interface lobe, a first outer track interface lobe, and a second outer track interface lobe, the first inner track interface lobe, the second inner track interface lobe, the first outer track interface lobe, and the second outer track interface lobe extending laterally from the load beam, wherein the first inner track interface lobe, the second inner track interface lobe, the first outer track interface lobe, and the second outer track interface lobe are displaced along the longitudinal axis, wherein the first inner track interface lobe extends from the first side surface and the second inner track interface lobe extends from the second side surface in a direction opposite to the extension of the first inner track interface lobe,
    wherein the first inner track interface lobe and the second inner track interface lobe each comprise a first upper surface lying below a plane defined by a second upper surface of the first outer track interface lobe; and
    a channel extending along the longitudinal axis between the first inner track interface lobe and the second inner track interface lobe, wherein the longitudinal extension of the channel terminates before the first outer track interlace lobe and the second outer track interface lobe, and wherein the channel has a depth extending from the bottom surface toward the top surface,
    wherein each of the first inner track interface lobe, the second inner track interface lobe, the first outer track interface lobe, and the second outer track interface lobe are integral to the monolithic load beam,
    wherein the first inner track interface lobe, the second inner track interface lobe, the first outer track interface lobe, and the second outer track interface lobe are each configured to couple with a track having a plurality of mounting foot interface lobes,
    wherein the monolithic load beam is configured to undergo a plastic deformation along the channel in response to a load normal to the longitudinal axis and further configured to arrest the plastic deformation along the channel in response to a contact between at least one of the first inner track interface lobe and the plurality of mounting foot interface lobes or the second inner track interface lobe and the plurality of mounting foot interface lobes.

11. The energy attenuating mounting foot of claim 10, wherein in response to coupling with the track each of the first inner track interface lobe, the second inner track interface lobe, the first outer track interface lobe, and the second outer track interface lobe lie below a plane defined by the plurality of mounting foot interface lobes.

12. The energy attenuating mounting foot of claim 10, wherein the first outer track interface lobe contacts the plurality of mounting foot interface lobes and the first inner track interface lobe is separated from the plurality of mounting foot interface lobes in response to coupling with the track.

13. The energy attenuating mounting foot of claim 12, wherein the first inner track interface lobe contacts one of the plurality of mounting foot interfaces lobe in response to the plastic deformation.

14. The energy attenuating mounting foot of claim 10, wherein the load beam comprises a stud integral to the load beam.

15. The energy attenuating mounting foot of claim 10, wherein the load beam comprises at least one of steel, aluminum, aluminum alloy, titanium, or titanium alloy.

16. The energy attenuating mounting foot of claim 10, wherein the load beam comprises a martensitic precipitation-hardening stainless steel.

17. The energy attenuating mounting foot of claim 10, wherein a material grain direction of the load beam substantially parallels the longitudinal axis.

* * * * *